Figure 3:
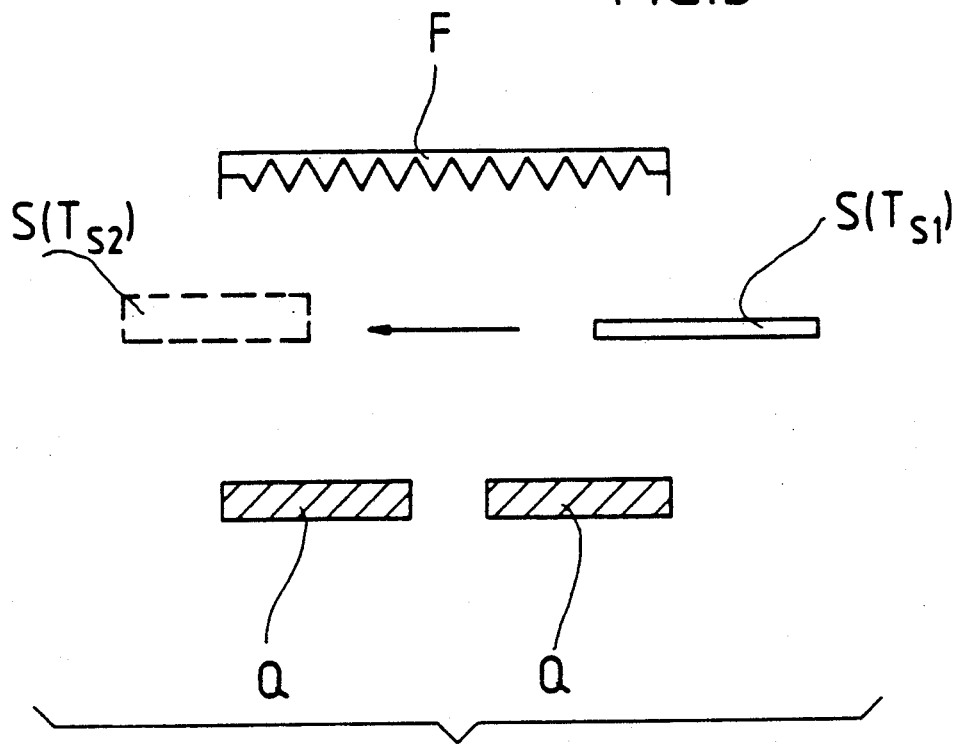
Figure 4:
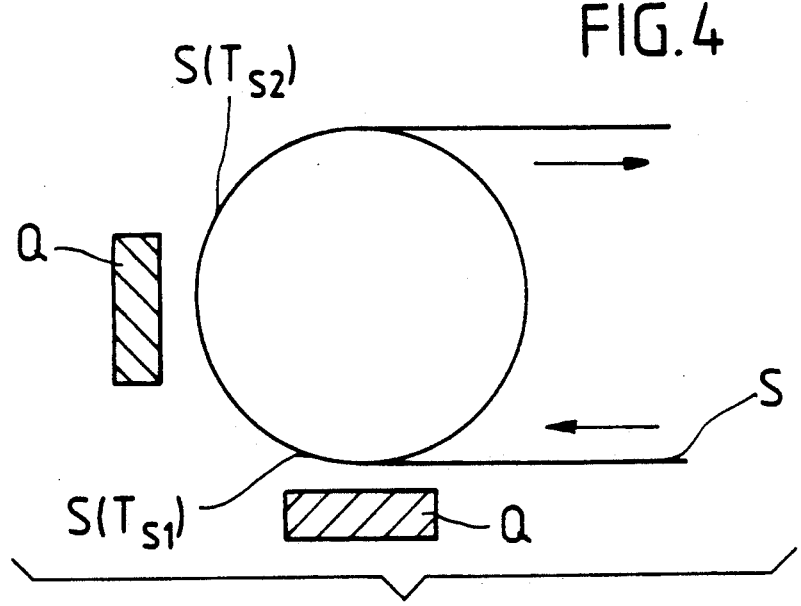

United States Patent [19]

Werner et al.

[11] Patent Number: 4,997,675
[45] Date of Patent: Mar. 5, 1991

[54] PRODUCTION OF MAGNETIC RECORDING MEDIA FOR PERPENDICULAR RECORDING

[75] Inventors: Arend Werner, Bad Duerkheim; Hartmut Hibst, Ludwigshafen; Erich Haedicke, Hirschberg, all of Fed. Rep. of Germany

[73] Assignee: BASF Aktiengesellschaft, Ludwigshafen, Fed. Rep. of Germany

[21] Appl. No.: 403,890

[22] Filed: Sep. 7, 1989

[30] Foreign Application Priority Data

Sep. 16, 1988 [DE] Fed. Rep. of Germany ....... 3831484

[51] Int. Cl.$^5$ ............................................. H01F 10/02
[52] U.S. Cl. ................................ 427/129; 204/192.2; 427/132; 427/251; 427/314
[58] Field of Search .................. 427/127–132, 427/48, 251, 255.2, 255.7, 296, 316, 314; 428/694, 900; 204/192.2

[56] References Cited

U.S. PATENT DOCUMENTS 4,210,946  7/1980  Iwasaki et al. .................. 360/131
4,429,016  1/1984  Sugita ............................. 428/692

OTHER PUBLICATIONS

Thin films for Magnetic Recording Technology: A Review, J. K. Howard, Journal Vac. Sci. Technol., A4, 1986, pp. 1–13.
Microstructure and Magnetic Properties of CoCr Thin Films Formed on Ge Layer Honds, Kakibayashi and Yoshida, IEEE Transact, Magn, 21, (1985), pp. 1426–1428.
Co-Cr Films for Perpendicular Recording, Wielinga and Lodder, IEEE Transact, Magn., 17, (1981), pp. 3178–3180.

Primary Examiner—Bernard Pianalto
Attorney, Agent, or Firm—Keil & Weinkauf

[57] ABSTRACT

Magnetic recording media for perpendicular recording are produced by coating a non-magnetic substrate by a PVD method with a cobalt-containing, ferromagnetic metal layer which has magnetic anisotropy perpendicular to the plane of the layer, by a process in which the temperature of the substrate is increased by external heating during coating.

6 Claims, 4 Drawing Sheets

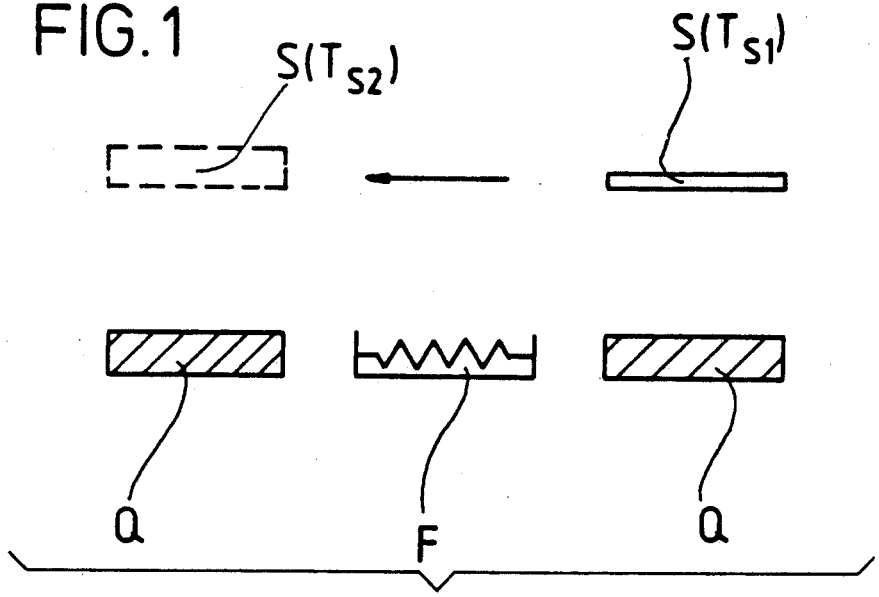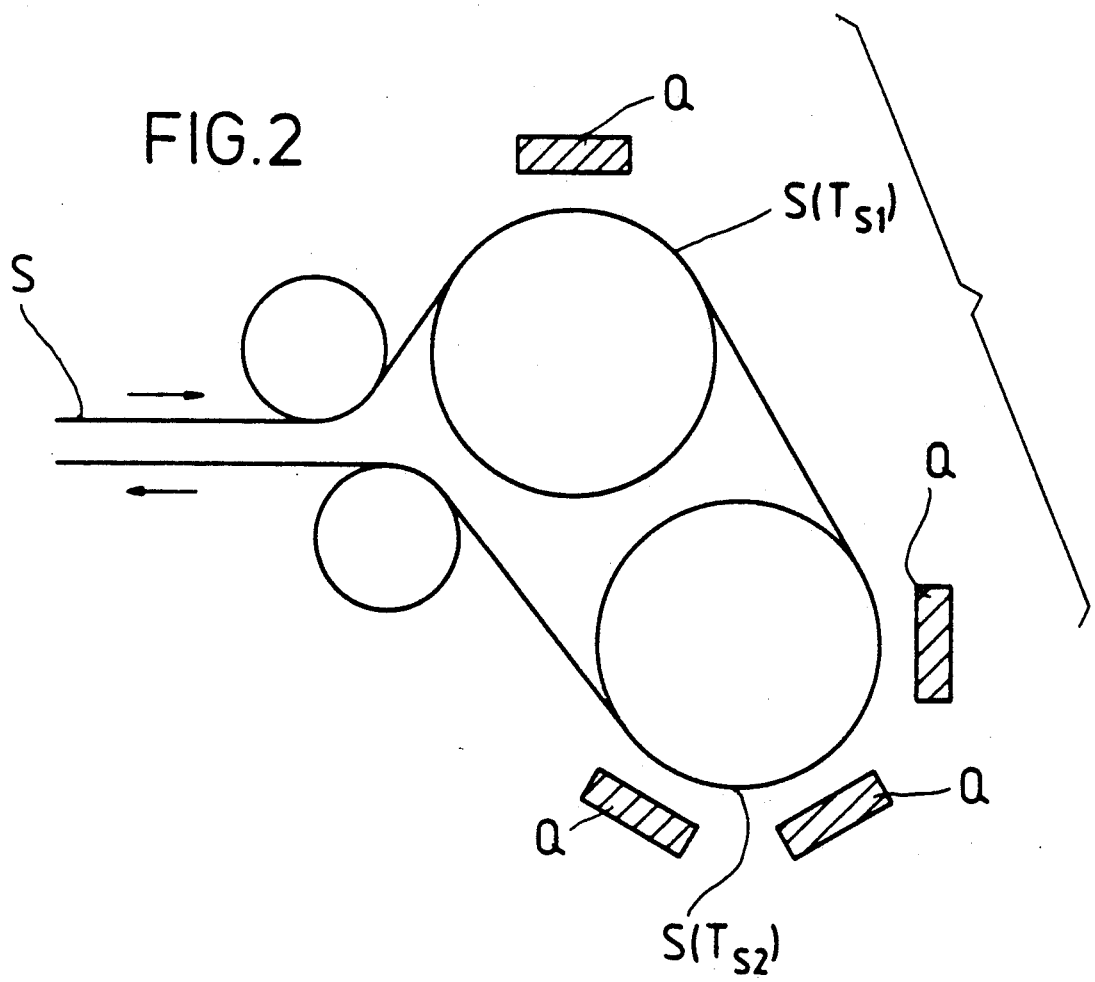

PRODUCTION OF MAGNETIC RECORDING MEDIA FOR PERPENDICULAR RECORDING

The present invention relates to a process for production of magnetic recording media for perpendicular recording by coating a nonmagnetic substrate by a PVD method with a cobalt-containing, ferromagnetic metal layer which shows magnetic anisotropy perpendicular to the plane of the layer.

The magnetic recording media now usually used consist of a nonmagnetic base and, applied to this, a magnetic layer which essentially consists of finely divided magnetic material in an organic binder matrix. A dispersion of the magnetic material in a solution of the organic binder is applied to the tape-like or disk-like base, which may be either flexible or rigid, by spin coating or by knife coating, and is solidified by physical and/or chemical means. Since, however, the further development of electronic information processing is constantly requiring higher and higher storage densities, problems are increasingly being encountered with the magnetic recording media having a pigment/binder magnetic layer.

Because of their physical properties, thin coherent layers of magnetic material, preferably metal alloys, are potential storage media having substantially higher storage density. A distinction is made here between longitudinal recording, in which the layer is magnetized in the plane of the layer, and perpendicular recording, where magnetization is effected perpendicular to the layer. With increasing storage density, the first method has the disadvantage of increasing demagnetization, with the result that the recording density is limited. In perpendicular recording, on the other hand, demagnetization advantageously decreases with increasing storage density, thus permitting higher recording densities than in the conventional longitudinal recording.

The magnetic recording media which are suitable for perpendicular recording must have a magnetic layer whose preferred magnetization direction (magnetically soft axis) is perpendicular to the plane of the layer. Co-Cr alloys containing from 15 to 30 atom % of Cr have proven a particularly advantageous material for such magnetic layers (DE-A 2 842 609, U.S. Pat No. 4 210 946). In addition to Cr, however, other alloy components, such as V, W, Mo, Ti, Ru, Rh and Pd, are also used, or threecomponent alloys of the type Co-Cr-M, where M is Ta, Rh, Pd, etc., are successfully employed (J. Howard, Thin films for magnetic recording technology: A review, J. Vac. Sci. Technol. A 4 (1986), 1-12). The common feature of all these materials is that they have a hexagonal crystal lattice and the magnetically soft axis is parallel to the c axis of the crystal lattice. Consequently, when these alloys are used as thin layers for perpendicular recording, it is necessary that as far as possible all of the c axes of the crystallites forming the layer are oriented perpendicular to the plane of the layer. A further requirement relates to the coercive force perpendicular to the plane of the layer ($H_c$-(perpen)), and $H_c$(perpen) should be as large as possible.

The PVD processes, sputtering and vaporization under greatly reduced pressure, have proven useful methods for the production of such thin Co-Cr layers (US-A 4 210 946, U.S. Pat. No. 4 429 016). Because of the high rates for industrial production, suitable methods are vapor deposition (preferably for film coating) or magnetron sputtering in various embodiments, for example using a planar magnetron or facing target arrangement (for solid substrates and films), while sputtering in the Rf diode mode is only of limited use because of the low rate.

In the production of Co-Cr layers for perpendicular recording it has been found that the quality of the crystallographic and magnetic perpendicular orientation is very substantially influenced by the type of substrate used and by intermediate layers applied beforehand to the substrate (Ti, Si, Ge, etc.) (M. Fukamato, Y. Honda, H. Kakibayashi and K. Yoshida, Microstructure and Magnetic Properties of Co-Cr Thin Films Formed on GeLayer, IEEE Transact. Magn. 21 (1985), 1426–1428). Through the choice of a suitable substrate or of a substrate modified by a suitable intermediate layer, it is possible to produce layers having very good perpendicular orientation, both by sputtering and by vapor deposition.

It is also known that Co-Cr layers produced by sputtering in the Rf diode mode have high $H_c$(perpen) values and good perpendicular crystallographic orientation (T. Wielinga and J. Lodder, Co-Cr Films for Perpendicular Recording, IEEE Transact. Magn. 17 (1981), 3178–3180). In the case of the other two coating processes, on the other hand, it is also necessary to heat the substrates in order to obtain the required high $H_c$(perpen) values. When the substrate is not heated, $H_c$(perpen) is typically about 20 kA/m for $Co_{80}Cr_{20}$. At a substrate temperature of about 250° C., $H_c$(perpen) increases to about 150 kA/m. However, in addition to affording the desired increase in $H_c$(perpen), heating the substrates has the disadvantageous effect of a substantial deterioration in the crystallographic and magnetic perpendicular orientation of the layers.

It is an object of the present invention to provide a process for the production of magnetic recording media which essentially consist of a substrate of one or more intermediate layers and a cobalt-containing, ferromagnetic metal layer having perpendicular anisotropy, in which the layers produced by magnetron sputtering or by vaporization under greatly reduced pressure have both high $H_c$(perpen) values and a pronounced crystallographic and magnetic perpendicular orientation.

We have found that this object is achieved by a process for the production of magnetic recording media which are suitable for perpendicular recording, by coating a nonmagnetic substrate by a PVD method with a cobalt-containing, ferromagnetic metal layer having magnetic anisotropy perpendicular to the plane of the layer, if, at the beginning of the PVD process for coating the subtrate with a cobalt-containing, ferromagnetic metal layer, the substrate is art a temperature $T_{S1}$, which is brought to a temperature $T_{S2}$ higher than $T_{S1}$ by external heating of the substrate during coating.

In the novel process, the flexible or rigid substrate is cleaned in a known manner and if necessary provided with one or more bottom layers. At this time, ie. before the beginning of coating with the Cocontaining magnetic layer, the substrate is cold, ie. $T_{S1}$ is substantially below the temperature required for achieving the high $_c$(perpen) values, in particular at from −50 to +100° C., preferably at room temperature. At this substrate temperature $T_{S1}$, the procedure for depositing the Co alloy is begun, and a layer having a thickness $d_1$ of from 1 to 200 nm, preferably from 5 to 50 nm, is applied. In the next step, the substrate is heated to 20 the temperature $T_{S2}$ required for achieving the desired $H_c$(perpen) value, which temperature is preferably from above 100 to 400° C. After $T_{S2}$ has been reached, coating is continued until the desired thickness $d_2$ of the magnetic layer is reached, where $d_1 << d_2$ and $d_2/d_1 =$ from 3 to 1000, preferably from 5 to 20. In an advantageous embodiment of the novel process, coating is not interrupted during the transition from $T_{S1}$ to $T_{S2}$. The transition from $T_{S1}$ to $T_{S2}$ may be linear, but any other transitions from $T_{S1}$ to $T_{S2}$ are possible. The heating time required for reaching $T_{S2}$, must be such that the layer thickness $d_1$ produced at $T_{S1}$ plus during the transition from $T_{S1}$ to $T_{S2}$ is substantially smaller than the total layer thickness $d_2$. Preferably, $d_2/d_1$ should be from 2 to 20.

FIGS. 1, 2, 3 and 4 illustrate the novel process schematically. In the FIGS., the processing of the rigid or flexible substrate (S) is indicated together with the particular temperature (T) in relation to the coating sources (Q) and the external heaters (F).

The novel process can be used to produce recording media for perpendicular magnetic recording by PVD processes which have a high coating rate and are distinguished from the prior art by the desired high coercive force $H_c$(perpen) and at the same time by the very good crystallographic and magnetic perpendicular orientation of the magnetic layer. This ensures a substantial improvement compared with the prior art, since, in the known procedures, the improvement of one property resulted in a deterioration in the others.

The Examples which follow illustrate the invention in more detail and compare it with experiments based on the known procedures. The coercive force $H_c$(perpen) in kA/m measured on the magnetic layers was determined using a vibrating sample magnetometer. The relative remanence $m_r$(para) is used as a measure of the quality of the magnetic perpendicular orientation and is determined from the hysteresis curve measured parallel to the plane of the layer. Layers having very good perpendicular magnetic orientation have very small $m_r$(para) values of, typically, 0.10. The half-width Δ-50 of the rocking curve of the (002) reflection is used as a measure of the quality of the perpendicular crystallographic orientation. For very well oriented Co-Cr layers on glass, Δ-is 3° and increases to more than 20° for poorly oriented layers.

COMPARATIVE EXPERIMENT 1

Figure 5:
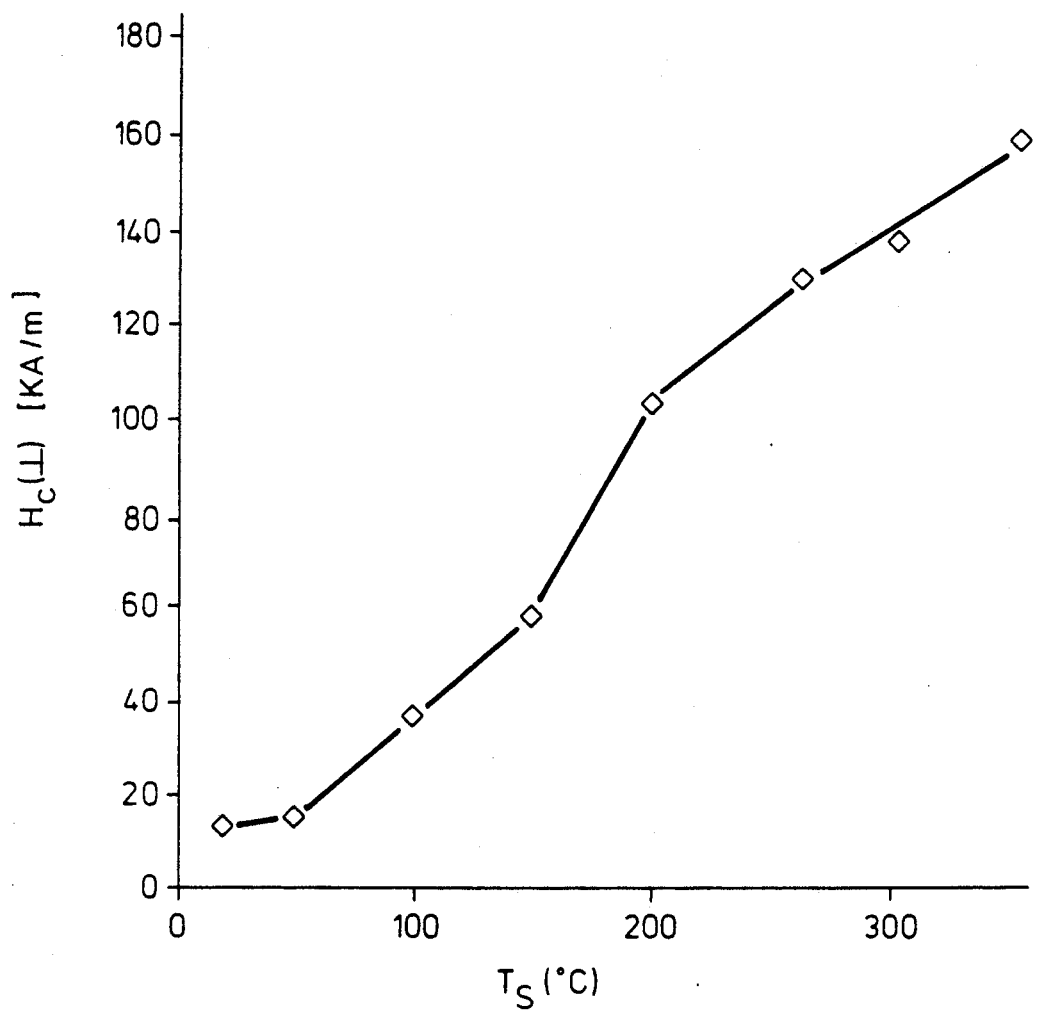
Figure 6A:
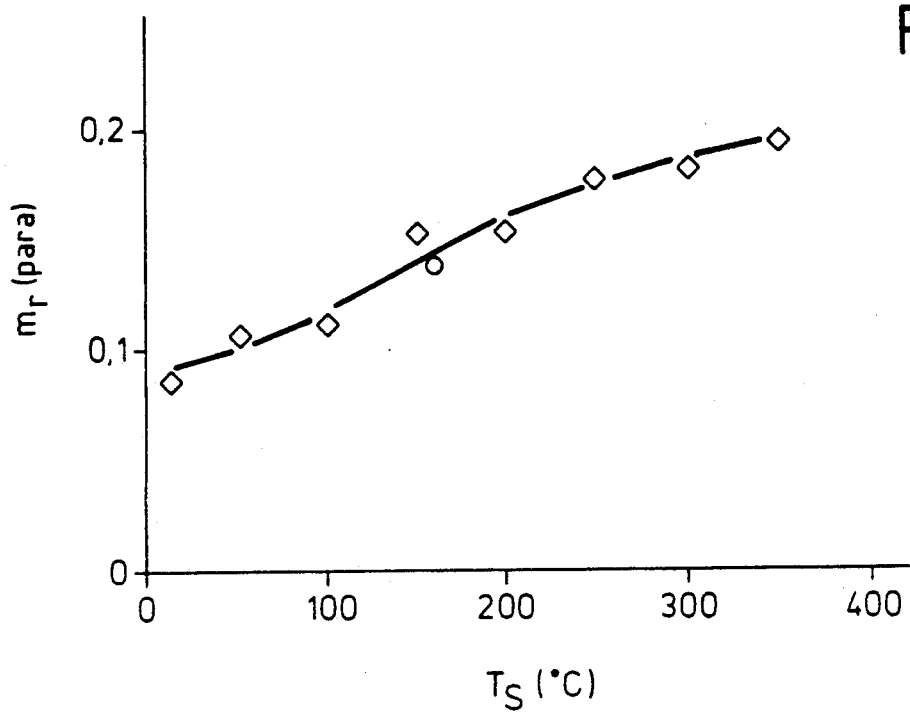
Figure 6B:
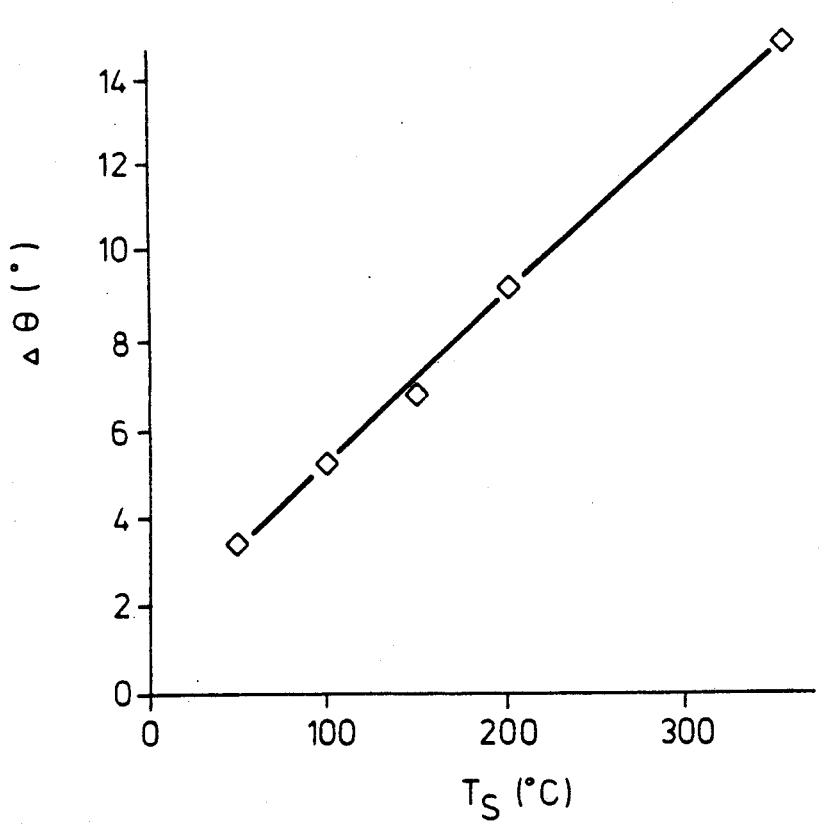

$Co_{79}Cr_{21}$ layers were applied by DC magnetron sputtering to glass substrates cleaned by- RF sputter etching. The deposition rate was 200 nm/min and the layers had a thickness of 500 nm. The substrate temperature $T_S$ set before the beginning of coating was between room temperature and 350° C. As a result of the increasing substrate temperature, $H_c$(perpen) increased from 15 kA/m (room temperature) to 160 kA/m ($T_{S=350°}$ C.) (FIG. 5). This desired increase in $H_c$(perpen) resulted in a substantial deterioration in the perpendicular crystallographic and magnetic orientation (FIGS. 6a and b). D- increased from 3.5° to 14.5° and $m_r$(para) deteriorated from 0.09 to 0.19.

EXAMPLE 1

$Co_{79}Cr_{21}$ layers were applied to cleaned glass substrates by DC magnetron sputtering. The deposition rate was 200 nm/min and the layers had a thickness of 500 nm. The substrate temperature $T_S$ was increased from 20° C. to 180° C. by external heating during deposition of the first 100 nm and then kept constant during further coating. The resulting layers had the following properties: D- =4°, $m_r$(para) =0.12 and $H_c$(perpen) =80 kA/m.

COMPARATIVE EXPERIMENT 2

$Co_{78}Cr_{22}$ layers were applied to a 50 1m thick polyimide film at a substrate temperature of 20° C. by simultaneous vaporization of Co and Cr. Vaporization was effected by means of two electron beam vaporizers, at a rate of 120 nm/min for Co and 36 nm/min for Cr. The resulting 300 nm thick layers had a low $H_c$(perpen) of 26 kA/m. The perpendicular crystallographic and magnetic orientations were D- =11° and $m_r$(para)=0.16.

COMPARATIVE EXPERIMENT 3

$Co_{78}Cr_{22}$ layers were produced as described in Comparative Experiment 2. The polymide film was heated to 150° C. by external heating before the beginning of the coating procedure, in order to obtain the desired increase in $H_c$(perpen). As a result, $H_c$(perpen) did increase to 54 kA/m but the perpendicular orientation deteriorated substantially: D- =20°, $m_r$(para)=0.29.

EXAMPLE 2

$Co_{78}Cr_{22}$ layers were applied by vapor deposition as described in Comparative Experiment 2. Here, after deposition of a 10 nm thick $Co_{78}Cr_{22}$ layer the film was heated very rapidly, in the course of 1 minute, to 150° C. after which deposition was continued for a further 290 nm. These layers had an $H_c$(perpen) of 50 kA/m and, with D- =13° and $m_r$(para)=0.18, a substantially better perpendicular orientation than the conventionally produced layers according to Comparative Experiment 3.

We claim:

1. A process for the production of a a magnetic recording medium for perpendicular recording by coating a nonmagnetic substrate by a PVD method with a cobalt-containing, ferromagnetic metal layer showing magnetic anisotropy perpendicular to the plant of the layer, wherein, at the beginning of the PVD process for coating the substrate with a cobalt-containing, ferromagnetic metal layer, the substrate is at a temperature $T_{S1}$ higher than $T_{S1}$ by external heating of the substrate during coating.

2. A process as defined in claim 1, wherein the temperature $T_{S1}$ is from −50 to +100 ° C. and the temperature $T_{S2}$ is from above 100° C. up to 400° C.

3. A process as defined in claim 1, wherein , in coating the substrate with the cobalt-containing, ferromagnetic metal layer, the thickness $d_1$ of this layer before the temperature $T_{S2}$ is reached is from 1 to 200 nm and the ratio of the total thickness $d_2$ to the thickness $d_1$ of this layer if from 3 to 1000.

4. A process for the production of a magnetic recording medium for perpendicular recording by coating a nonmagnetic substrate by a PVD method with a cobalt-containing, ferromagnetic metal layer having magnetic anisotropy perpendicular to the plane of the layer, wherein, at the beginning of the PVD process for coating the substrate with a cobalt-containing, ferromagnetic metal layer, the substrate is at a temperature $T_{S1}$ and is brought, by external heating, to a temperature $T_{S2}$ which is higher than $T_{S1}$ and at which coating is continued.

5. A process as defined in claim 4, wherein coating of the substrate with the cobalt-containing, ferromagnetic metal layer is continued while the substrate is heated from temperature $T_{S1}$ to the temperature $T_{S2}$, and the ratio of the total thickness $d_2$ of the layer to the thickness $d_1$ of the metal layer deposited by the time temperature $T_{S2}$ has been reached is from 2 to 20.

6. A process as defined in claim 4, wherein the temperature $T_{S1}$ is from −50 to +100° C. and the temperature $T_{S2}$ is from above 100° C. up to 400° C.

* * * * *